United States Patent
Gil-Martinez et al.

(10) Patent No.: US 11,382,341 B2
(45) Date of Patent: Jul. 12, 2022

(54) PROCESS FOR PREPARING A BEVERAGE OR BEVERAGE COMPONENT FROM BREWER'S SPENT GRAINS

(71) Applicant: Anheuser-Busch InBev S.A., Brussels (BE)

(72) Inventors: Jorge Gil-Martinez, Leuven (BE); Elke Arendt, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 16/322,475

(22) PCT Filed: Aug. 14, 2017

(86) PCT No.: PCT/EP2017/070631
§ 371 (c)(1),
(2) Date: Jan. 31, 2019

(87) PCT Pub. No.: WO2018/033522
PCT Pub. Date: Feb. 22, 2018

(65) Prior Publication Data
US 2019/0200640 A1     Jul. 4, 2019

(30) Foreign Application Priority Data

Aug. 16, 2016 (EP) .................................. 16184254

(51) Int. Cl.
*A23J 1/00* (2006.01)
*C12C 5/00* (2006.01)
(Continued)

(52) U.S. Cl.
CPC ................. *A23J 1/005* (2013.01); *A23J 1/12* (2013.01); *C12C 5/004* (2013.01); *C12C 5/006* (2013.01);
(Continued)

(58) Field of Classification Search
CPC ... A23J 1/005; A23J 1/148; A23J 1/12; C12C 5/004; C12C 5/006; C12C 11/003; C12Y 302/01004; Y02P 60/87
(Continued)

(56) References Cited

U.S. PATENT DOCUMENTS 8,563,056 B2    10/2013 Mulder et al.
2006/0141097 A1*  6/2006 Guo .......................... A23L 2/66
                                                            426/61
(Continued)

FOREIGN PATENT DOCUMENTS

EP     0 369 818     5/1990
EP     3 085 243    10/2016
(Continued)

OTHER PUBLICATIONS

Forssell, P. et al. Hydrolysis of Brewer's spent grain by carbohydrate degrading enzymes. J. Inst. Brewing. 2008. 114: 306-314 (Year: 2008).*
(Continued)

*Primary Examiner* — Hamid R Badr
(74) *Attorney, Agent, or Firm* — Levy & Grandinetti

(57) ABSTRACT

A process prepares a beverage or beverage component. The process includes an enzymatic treatment of brewer's spent grain including addition of one or a combination of enzymes with alpha-amylase, gluco-amylase, cellulase, xylanase, protease and/or beta-glucanase activity and fermentation by a strain of lactic acid bacteria. The combination of enzymes and enzymatic treatment conditions is such that the lactic acid bacteria produce 4.5 g/L lactic acid and metabolise sugar such that the resulting fermented broth contains less than 2.5% w/w and preferably less than 0.5% w/w residual sugar or the lactic acid bacteria produce 4.5 g/L lactic acid
(Continued)

and metabolise sugar such that the resulting fermented broth contains at least 2.5% w/w residual sugar.

18 Claims, 1 Drawing Sheet

(51) Int. Cl.
 *C12C 11/00* (2006.01)
 *A23J 1/12* (2006.01)
(52) U.S. Cl.
 CPC .... *C12C 11/003* (2013.01); *C12Y 302/01004* (2013.01); *Y02P 60/87* (2015.11)
(58) Field of Classification Search
 USPC .......................................................... 426/31
 See application file for complete search history.

(56) References Cited

U.S. PATENT DOCUMENTS

| | | | |
|---|---|---|---|
| 2008/0102162 | A1 | 5/2008 | Delcour et al. |
| 2010/0166926 | A1 | 7/2010 | Jerkovic et al. |
| 2012/0230955 | A1 | 9/2012 | Ekhart et al. |
| 2020/0040110 | A1* | 2/2020 | Vilaplana ............... A23L 33/24 |

FOREIGN PATENT DOCUMENTS

| | | |
|---|---|---|
| GB | 1 304 005 | 1/1973 |
| GB | 2 092 878 | 8/1982 |
| GB | 2 220 124 | 1/1990 |
| JP | H10120704 | 5/1998 |
| JP | H10237107 | 9/1998 |
| JP | 2009-112234 | 5/2009 |
| WO | WO 2004/050820 | 6/2004 |
| WO | WO 2006/002495 | 1/2006 |
| WO | WO 2007/136257 | 11/2007 |
| WO | WO 2008/068344 | 6/2008 |
| WO | WO 2012/084225 | 6/2012 |

OTHER PUBLICATIONS

Lu, Z.X. et al., "Arabinoxylan fibre improves metabolic control in people with Type II diabetes," European Journal of Clinical Nutrition, vol. 58, pp. 621-628 (2004).
Garcia, A.L. et al., "Arabinoxylan consumption decreases postprandial serum glucose, serum insulin and plasma total ghrelin response in subjects with impaired glucose tolerance," European Journal of Clinical Nutrition, vol. 61, pp. 334-341 (2007).
Sanchez, J. et al., "Arabinoxylan-oligosaccharides (AXOS) affect the protein/carbohydrate fermentation balance and microbial population dynamics on the Simulator of Human Intestinal Microbial Ecosystem," Microbial Biotechnology vol. 2(1), pp. 101-113(2009).
Cloetens, L. et al., "Tolerance of arabinoxylan-oligosaccharides and their prebiotic activity in healthy subjects: a randomised, placebo-controlled cross-over study," British Journal of Nutrition, vol. 103, pp. 703-713 (2010).
European Food Safety Authority, "Scientific Opinion on Dietary Reference Values for carbohydrates and dietary fibre," EFSA Journal, vol. 8(3):1462 (2010).
European Food Safety Authority, "Scientific Opinion on the substantiation of health claims related to arabinoxylan produced from wheat endosperm and reduction of post-prandial glycaemic responses," EFSA Journal, vol. 9(6):2205 (2011).
European Food Safety Authority, "Scientific Opinion on Dietary Reference Values for energy," EFSA Journal, vol. 11(1):3005 (2013).
Cao, L. et al., "Antitumor and immunomodulatory activity of arabinoxylans: a major constituent of wheat bran," Int. J. Biol. Macromol. vol. 48(1), pp. 160-164 (2011).
Reis, Sofia et al., "Evaluation of the prebiotic potential of arabinoxylans from brewer's spent grain," Appl. Microbiol. Biotechnol., vol. 98, pp. 9365-9373 (2014).
Teixera, Cristina et al., "Application of a dynamic gastrointestinal in vitro model combined with a rat model to predict the digestive fate of barley dietary fibre and evaluate potential impact on hindgut fermentation," Bioactive Carbohydrates and Dietary Fibre, vol. 9, pp. 7-13 (2017).
Zhou, Sumei et al., "Comparison of the immunological activities of arabinoxylans from wheat bran with alkali and kylanase-aided extraction," Carbohydrate Polymers, vol. 81(4), pp. 784-789 (2010).
Neyrinck, A. et al., "Prebiotic Effects of Wheat Arabinoxylan Related to the Increase in Bifidobacteria, Roseburia and Bacteroides/Prevotella in Diet-Induced Obese Mice," PLoS One, vol. 6, Issue 6 (Jun. 2011).
Jin, Zhen et al., "Lactic Acid Production from Distiller's Grains by Simultaneous Saccharification and Fermentation," International Conference on Mechanic Automation and Control Engineering (2010).
Mussatto, Solange I. et al., "Effects of medium supplementation and pH control on lactic acid production from brewer's spent grain," 40 Biochemical Engineering Journal 437-444 (2008).
Matthias, Thiago Rocha dos Santos et al., "Characterization and determination of brewer's sold wastes composition," 121 Institute of Brewing and Distilling 400-404 (2015).
Severini, Carla et al., "Effect of enzymatic and technological treatments on solubilization of arabinoxylans from brewer's spent grain," 65 Journal of Cereal Science 162-166 (2015).

* cited by examiner

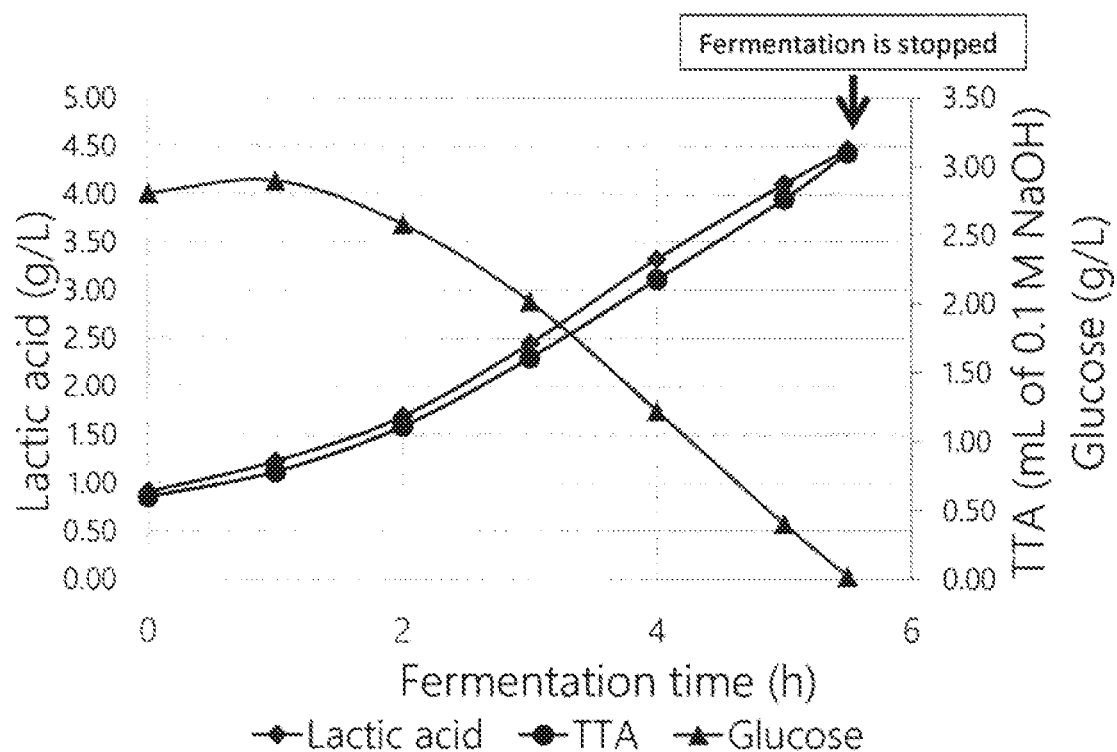

PROCESS FOR PREPARING A BEVERAGE OR BEVERAGE COMPONENT FROM BREWER'S SPENT GRAINS

FIELD OF THE INVENTION

The present invention concerns a beverage or beverage component obtained by the enzymatic saccharification and fermentation of brewer's spent grain and a process of preparing such beverage, as well as the use of a component obtained by the fermentation of brewer's spent grain for preparing a beverage and/or for preparing other foodstuffs. In a further aspect the present invention provides compositions of a beverage obtained through the fermentation of brewer's spent grains, in particular food compositions that comprise nutritional claims such as high protein/source of protein, high fiber/source of fiber, particularly soluble and insoluble arabinoxylans, and optionally prebiotics such as Beta-glucans and probiotics such us *Lactobacillus*.

BACKGROUND TO THE INVENTION

Brewers' spent grain (BSG) is the most abundant co-product generated in the beer-brewing process. This material consists of the barley grain husks obtained as solid portion after the wort production. Since BSG is rich in sugars and proteins, the main use to date for the utilization of this product has been as animal feed. However, for exactly these same reasons, because it is high in dietary fiber and proteins, BSG is of interest for application in different areas particularly when considering its valuable component composition as a potential source of bioactive, health-promoting compounds.

BSG consists of the seed coat-pericarp-husk layers that covered the original barley grain. The starch content is usually low, and the composition of BSG mainly contains fibers, which are non-starch polysaccharides (NSP; hemicellulose in the form of arabinoxylans (AX) and cellulose) and significant quantities of proteins and lignin, with arabinoxylans (AX) typically constituting the most abundant component. Therefore, BSG is basically a lignocellulosic material. Fiber constitutes about half of the BSG composition on a dry weight basis, while proteins can constitute up to 30% of the dry weight basis. This high fiber and protein content makes BSG an interesting raw material for food applications.

As would be expected, cellulose ($\beta$-(1,4)-linked glucose residues) is another abundant polysaccharide in BSG. Certain levels of (1-3,1-4)-$\beta$-D-glucan may also be present. The most abundant monosaccharides in BSG are xylose, glucose, and arabinose, while traces of traces of rhamnose and galactose have also been found.

Arabinoxylans (AX) constitute up to 25% of dry weight in BSG. Most of these are associated with other fibre components (cellulose or lignin) or with protein and are not bioavailable (water-unextractable arabinoxylans, WUAX). A small fraction of WUAX can be me made soluble (water-extractable arabinoxylans, WEAX) via enzymatic treatment. Consumption of WEAX has been shown to have positive health effects, including prebiotic effects, regulation of post-prandial blood glucose levels, lowering cholesterol levels, tumor suppression and immunomodulating effects. It is, therefore, desirable to increase the proportion of WEAX in BSG preparations for human consumption.

The protein content of BSG typically is present at levels of approximately 30% per dry weight basis. The most abundant are hordeins, glutelins, globulins and albumins. Essential amino adds represent approximately 30% of the total protein content, with lysine being the most abundant, while non-essential amino acids in BSG constitute up to 70% of the total protein content. This is significant because lysine is often deficient in cereal foods. In addition, BSG also contains a variety of minerals elements, among which silicon, phosphorus, calcium and magnesium are the most abundant.

The present invention is directed to a particular BSG utilization for beverage production, allowing obtaining a beverage with beneficial effect on the organization of the intestinal microbial community, and comprising nutritional claims referring the high protein content or the beverage serving as source of protein and an increased level of health-promoting WEAX. This invention further covers the method for preparing such a beverage. Therefore, the present invention does not only address new uses of brewer's spent grain, but specifically addresses a higher valorization of the brewer's spent grain than currently possible.

SUMMARY OF THE INVENTION

The present invention achieves a high valorization of brewer's spent grain by use of this material for preparing healthy and/or functional beverages with specific nutritional characteristics such as high protein content or source of protein, desired by sportsmen and craftsmen to recover from intense physical exercise. Additionally, the mentioned beverage contains high fiber, a sufficient proportion of which is comprised by health-promoting water-extractable arabinoxylans (WEAX). Furthermore, the beverage preferably contains prebiotics such as Beta-glucans and/or probiotics such as *Lactobacillus*.

In particular, the present invention concerns a process for preparing a beverage or beverage component comprising the steps of:
  enzymatically treating brewer's spent grain including addition of one or a combination of enzymes with alpha-amylase, gluco-amylase, cellulase, xylanase, protease and/or beta-glucanase activity and fermentation of the brewer's spent grain by a strain of lactic acid bacteria, wherein the combination of enzymes and enzymatic treatment conditions are such that:
  said lactic acid bacteria produces 4.5 g/L lactic acid and metabolises sugar such that the resulting fermented broth contains less than 2.5% w/w, preferably less than 0.5% w/w residual sugar; or said lactic acid bacteria produces 4.5 g/L lactic acid and metabolises sugar such that the resulting fermented broth contains at least 2.5% w/w residual sugar The present invention also concerns a beverage, beverage component or food component obtained by fermentation of saccharified brewer's spent grain and homogenization of fermented broth and spent grain, the beverage or beverage component comprising proteins in a level sufficiently high such that at least 12% and preferably at least 20% of the total caloric value of the beverage or beverage component originates from proteins therein.

Additionally, the present invention concerns a beverage or beverage component obtained by fermentation of saccharified brewer's spent grain and filtering the fermented broth from the spent grain.

The present invention further concerns the use of a beverage component as defined supra for obtaining a final beverage by mixing with another beverage component.

The present invention finally concerns the use of lactic acid bacteria (LAB) for fermenting brewer's spent grain in the preparation of a beverage or beverage component.

SUMMARY OF THE INVENTION

The process according to the present invention preferably comprises the steps of:
fermentation of the saccharified brewer's spent grain with lactic acid bacteria and/or acetic acid bacteria and/or probiotics to obtain a fermented broth; and
filtering the fermented broth and collecting the permeate to obtain the beverage or beverage component (filtered beverage or beverage component); or
homogenizing the fermented broth to obtain the beverage or beverage component (homogenized beverage or beverage component).

The enzyme treatment of the brewer's spent grain preferably includes the addition of one or more enzymes with following enzymatic activity to the brewer's spent grain: alpha-amylase, gluco-amylase, cellulase, xylanase, protease, Beta-glucanase and/or admixtures thereof. Treatment with said enzymes results in an increase of the levels of health-promoting soluble arabinoxylans (WEAX).

Preferably, the fermentation of the fermentable broth is achieved by lactic acid bacteria, preferably lactic acid bacteria of the species *Lactobacillus plantarum* and/or *Lactobacillus rhamnosus*, more preferably the strain *Lactobacillus plantarum* F10 and/or *Lactobacillus rhamnosus* GG (LGG®).

According to a preferred embodiment of the invention, the beverage or beverage component is supplemented by a probiotic microorganism after pasteurization, preferably a lactic acid bacteria, more preferably *Lactobacillus rhamnosus*, and more preferably the strain *Lactobacillus rhamnosus* GG (LGG®).

The beverage or beverage component can be: a low energy beverage having a caloric value of less than 20 kcal/100 g; and/or have a fat content of less than 1.5 w %, preferably less than 0.5 w % and/or have a sugar content of less than 2.5 w %, preferably less than 0.5 w %; and/or have a fiber content of at least 1.48 per 100 mL of beverage or beverage component; and/or have a soluble arabinoxylan content of 1.4% w/v, preferably 3% w/v The beverage or beverage component may comprise prebiotics and/or probiotics, for example by supplementing the beverage by a probiotic microorganism after pasteurization, preferably a lactic acid bacteria, more preferably *Lactobacillus rhamnosus*, and more preferably the strain *Lactobacillus rhamnosus* GG (LGG®).

The beverage or beverage component is preferably lactose free.

BRIEF DESCRIPTION OF THE FIGURES

FIG. 1 shows an example of simultaneous saccharification and fermentation (SSF) process. Bacterial fermentation causes an increase in lactic acid and titratable acidity in the media. There is an initial increase in sugar concentration due to the saccharification process. After a short lag phase, bacteria begin consuming the sugar, and its concentration decreases. Fermentation is stopped when ~4.5 g/L lactic acid are produced (black arrow). In this example, the enzyme mix and initial sugar in BSG are such that no residual sugar is left at the point of stopping the fermentation.

DEFINITIONS

Barley is the main raw material used for the production of beer. However, other cereals such as corn or rice are typically used together with malted barley. During the brewing process the starchy endosperm of these cereals is subjected to enzymatic degradation, resulting in the liberation of fermentable (maltose and maltotriose, and a minor percentage of glucose) and non-fermentable carbohydrates (dextrins), proteins, polypeptides and amino acids. The thus produced medium (which will be fermented into beer by the action of yeast) is known as wort. The insoluble grain components (comprising mainly the grain coverings) is the brewers' spent grain (BSG). In traditional brewing employing a lauter tun, the BSG components play an important role as they form the bed through which the mash is filtered to produce wort. Therefore, the initial milling of the malt must be such that the grain coverings remain intact so as to form an adequate filter. Today, while many small or craft breweries still use this method of mash filtration, many larger breweries employ a mash filter which relies less on the filtration function of the BSG and thus malt can be milled more extensively.

The brewer's spent grain contains all the solids that have been separated from the wort by filtration; it includes what is left of the barley malt and the adjuncts. The spent grain consists mainly of the pericarp and hull portions of the barley and of non-starchy parts of corn, provided corn grits were used as an adjunct. Brewer's spent grain is a lignocellulosic material typically comprising lipids, lignin, proteins, cellulose, hemicellulose and some ash. For the description and claims of this invention the wording "brewer's spent grain" (BSG) will be used in accordance with the definition here above.

Extract in the brewing context, and in the context of this invention, refers to soluble solids extracted into a liquid phase during mashing (for brewing) or SSF (this invention). It is understood that the overwhelming majority of these solids are fermentable sugars, like maltose (in brewing) or glucose (in brewing and SSF of this invention).

Product water refers to water used in the brewing process, that has suffered a defined and standard process for making it suitable for consumption.

Nutritional definitions as defined by the European Commission (http://ec.europa.eu/food/safety/labelling_nutrition/claims/nutrition_claims/index_en.htm), see Table below:

| Nutritional claim | Definition |
| --- | --- |
| Low energy | <20 kCal per 100 g |
| Fat free | <0.5% fat content |
| Low fat | <1.5% fat content |
| Very low salt | <0.4% salt content |
| Source of fiber | >3% fiber content OR > 1.5 g fiber per 100 kCal |
| Sugars-free | <0.5% w/v sugar content |
| Low sugars | <2.5% w/v sugar content |
| 'With no added sugars' | Does not contain any added mono- or disaccharides or any other food used for its sweetening properties. |
| High in fiber | >6% fiber content OR > 3 g fiber per 100 kCal |
| Source of protein | >12% of the energy provided by protein |
| High in protein | >20% of the energy provided by protein |

Digestion of AX either enzymatically or otherwise results in an increase of the soluble fraction of arabinoxylans (WEAX). This fraction is responsible for most of the health-promoting effects of arabinoxylans. Among the many positive effects WEAX have on health we find:
1. reduction of postprandial glucose levels in individuals with compromised glucose metabolism (Lu et al. 2004; Garcia et al. 2007)

2. tumor suppressing activity (Cao et al. 2011)
3. reduction of obesity, cholesterol levels and restoration of beneficial gut bacteria in high fat diets (Neyrinck et al. 2011)
4. Immune-enhancing effects (Zhou et al. 2010)
5. prebiotic effects, including promoting healthy gut bacteria and short chain fatty acid in distal colon (Cloetens et al. 2010; Sanchez et al. 2009)

Additionally, there is evidence that preparations of arabinoxylans from brewer's spent grains (BSG-AX) can exert the same prebiotic effects as the better-studied wheat-derived arabinoxylans, namely:
6. BSG-AX are not absorbed in the small intestine and reach the colon (Teixeira et al. 2017); BSG-AX promote proliferation of gut bacteria, particularly beneficial species like, for example, those of the *Bifidobacteria* genus, and BSG-AX promote the production of short chain fatty acids by said bacteria (Reis et al. 2014)

The documented effects listed above were elicited by the following dosages:
(1) 0.12 g/kg body weight/day, (2) 0.4 g/kg body weight/day, (3) 10% of diet, (4) 0.1 g/kg day, (5) 0.14 g/kg weight/day and 0.6% (w/v), (6) 0.6 g/kg body weight/day Additionally, a patent concerning the use of soluble arabinoxylans extracted from wheat (Ekhart et al. 2012), recommends that a daily dosage of 0.08 g/kg day would be adequate to obtained the claimed health effects, namely prebiotic effect and decrease of symptoms associated with high-fat diets.

European Food Safety Authority has concluded that there is a cause effect relationship between the consumption of wheat arabinoxylan and the reduction of postprandial glucose levels (Efsa Panel on Dietetic Products 2011). Based on the provided evidence EFSA suggests that to obtain the claimed effect, 4.8% w/w of consumed carbohydrate should be soluble arabinoxylans. For a healthy 70 kg adult with an average 2200 kcal daily intake (EFSA Panel on Dietetic Products Nutrition and Allergies 2013), of which 45% are carbohydrates (EFSA Panel on Dietetic Products Nutrition and Allergies 2010), this corresponds to 0.17 g/kg body weight/day.

It is therefore considered that no less than 0.1 g/kg body weight/day, is a sufficient dose of WEAX to have positive health effects.

The fibre-solubilization and saccharification enzyme process described here results in a beverage, beverage ingredient or food ingredient with no less than 1.4% (w/v) soluble arabinoxylans.

Finally, lactose free refers to a product that contains no trace of this compound. The present invention refers to a beverage produced through the fermentation of BSGs, therefore containing no dairy product and thus lactose free.

DETAILED DESCRIPTION OF A PREFERRED EMBODIMENT

The process according to the present invention generally comprises the steps of:
Providing brewer's spent grain;
Performing saccharification and fibre solubilization by enzymatic treatment of the brewer's spent grain;
Fermenting the saccharified brewer's spent grain with lactic acid bacteria and/or acetic acid bacteria and/or probiotics to obtain a fermented broth; and
filtering the fermented broth and collecting the permeate to obtain the beverage or beverage component; or
homogenizing the fermented broth to obtain the beverage or beverage component.

The brewer's spent grain is preferably obtained from a regular beer production process, wherein malt and potentially some adjuncts such as corn, rice, sorghum, wheat, barley, rye, oat or combinations thereof are mixed with water to form a mash wherein enzymes—either originating from the barley malt or added separately to the mash—are allowed to break down starch into fermentable sugars, typically a mixture of glucose, maltose and maltotriose. At the end of the mashing, the mash is filtered to obtain a fermentable wort that is further processed in to beer. The retentate of the mash filtering is the brewer's spent grain (BSG).

BSG comprises the seed coat-pericarp-husk layers that covered the original barley grain. BSG's composition mainly comprises fibers, which are non-starch polysaccharides (NSP; hemicellulose in the form of arabinoxylans (AX) and cellulose) and significant quantities of proteins and lignin, with arabinoxylans (AX) typically constituting the most abundant component. Therefore, BSG is basically a lignocellulosic material. Fiber constitutes about half of the BSG composition on a dry weight basis, while proteins can constitute up to 30% of the dry weight basis. This high fiber and protein content makes BSG an interesting raw material for food applications.

As would be expected, cellulose ($\beta$-(1,4)-linked glucose residues) is another abundant polysaccharide in BSG. Certain levels of (1-3,1-4)-$\beta$-D-glucan may also be present. The most abundant monosaccharides in BSG are xylose, glucose, and arabinose, while traces of traces of rhamnose and galactose have also been found.

The protein content of BSG typically is present at levels of approximately 30% per dry weight basis. The most abundant are hordeins, glutelins, globulins and albumins. Essential amino acids represent approximately 30% of the total protein content, with lysine being the most abundant, while non-essential amino acids in BSG constitute up to 70% of the total protein content. This is significant because lysine is often deficient in cereal foods. In addition, BSG also contains a variety of minerals elements, among which silicon, phosphorus, calcium and magnesium are the most abundant.

The BSG obtained from a lager beer production process typically comprises hemicellulose (20-25 w % on dry matter); cellulose (12-25 w % on dry matter); protein (19-30 w % on dry matter); lignin (12-28 w % on dry matter); lipid (ca. 10 w % on dry matter); ash (2-5 w % on dry matter); and low amounts of fructose, lactose, glucose and maltose.

The BSG is highly nutritious and very sensitive for spoilage by micro-organisms, hence heat treating of the BSG is desired to increase the shelf life. In this sense, the high water content of BSGs in the moment of their production (wort filtration), which is in the range of 75% (25% total solids), increases the instability of the material. For this reasons preferably fresh spent grains are used in the process of the present invention, and/or BSGs are stabilized or treated for sterilization, preferably by boiling.

In a process according to the present invention, BSGs, preferably as produced during the brewing process (in the range of 25% total solid content), and more preferably collected just after their production, are mixed with distilled water, or preferably hot product water, to a final dry matter content of between 6 and 10%, more preferably between 8 and 9%, and subsequently treated for stabilization, for example by heat treatment such as by boiling for 60 minutes. Subsequently, the mixture of BSGs and water is exposed to fibre solubilization, saccharification and fermentation, preferably to a simultaneous process of saccharification and fermentation (SSF). Commercial enzymatic products used for the fibre solubilization and saccharification of the BSG in the present invention will have at least one of following activities: xylanase (including endo-xylanase); cellulase; glucanase (including beta-glucanase); glucoamylase, protease, and or admixtures thereof. Preferably, the enzymatic mixture use will contain starch, dextrin, protein and fiber degrading activities. More preferably, these activities will comprise gluco-amylase, pullulanase, alpha-amylase, beta-glucanase, xylanase and protease. Enzyme treatment with xylanase and protease solubilizes WUAX and increases the levels of health-promoting WEAX.

The choice of enzymes and conditions will affect the amount of sugar released from fiber in the saccharification process. Because bacterial fermentation is stopped after production of a determined amount of acid, the amount of sugar released will affect the amount of residual sugar left after fermentation. Example 1 shows a combination of enzymes that results in a relatively low release of sugars from fiber.

As examples of such enzyme treatment, experiments were done by adding to a mixture of BSGs and water the following commercial products:

Enzyme combination 1

| Commercial Product | Supplier | Declared enzymatic activities | Dose |
|---|---|---|---|
| Ultraflo FABI | Novozymes | Beta-glucanase<br>Endo-xylanase<br>Alpha-amylase | 100 ppm |
| Attenuzyme PRO | Novozymes | Gluco-amylase<br>Pullulanase<br>Alpha-amylase | 500 ppm |
| Acellerase ® 1500 | DuPont | Exoglucanase<br>Endoglucanase<br>Hemi-cellulase<br>Beta-glucosidase | 1500 ppm |
| Alcalase ® 2.4 L | Novozymes | Protease (serine endopeptidase) | 200 ppm |

Enzyme combination 2

| Commercial Product | Supplier | Declared enzymatic activities | Dose |
|---|---|---|---|
| Ultraflo FABI | Novozymes | Beta-glucanase<br>Endo-xylanase<br>Alpha-amylase | 100 ppm |
| Attenuzyme PRO | Novozymes | Gluco-amylase<br>Pullanase<br>Alpha-amylase | 500 ppm |
| Allzyme | | proteases<br>Amylase<br>Xylanase<br>Beta-glucanse<br>Pectinase<br>cellulase<br>Phytase | 12500 ppm |
| Alcalase ® 2.4 L | Novozymes | Protease (serine endopeptidase) | 200 ppm |

Enzyme combination 3

| Commercial Product | Supplier | Declared enzymatic activities | Dose |
|---|---|---|---|
| Allzyme | | proteases<br>Amylase<br>Xylanase<br>Beta-glucanse<br>Pectinase<br>cellulase<br>Phytase | 10000 ppm |
| Alcalase ® 2.4 L | Novozymes | Protease (serine endopeptidase) | 200 ppm |

Table 1 shows how the combination of enzymes and saccharification time can be used to tailor the amount of sugar released from fiber. Incubation temperature was 55'C and pH was 5.5 in all reactions.

TABLE 1

Effect of diffetent enzyme combinations and incubation time on saccharification

| Enxyme combination | Incubation time (hrs.) | Initial extract (g/100 mL) | Final extract (g/100 mL) | Extract released (g/100 mL) |
|---|---|---|---|---|
| 1 | 72 | 1.8 | 3.7 | 1.9 |
| 2 | 72 | 1.8 | 4.5 | 2.7 |
| 3 | 96 (Allzyme), 24 (Alcalase) | 1.8 | 5.5 | 3.7 |

After hydrolysis, a fermentable broth is obtained that is subsequently fermented with lactic acid bacteria and/or acetic acid bacteria and/or probiotics. Preferably, such microorganisms are added during the hydrolysis, thus performing a simultaneous saccharification and fermentation process (SSF).

Examples of lactic acid bacteria include:

| Species | Strain | Metabolism | Origin |
|---|---|---|---|
| L. amylovorus | AB32 | Homofermentative | Sourdough |
| L. amylovorus | AB36 | Homofermentative | Sourdough |
| L. brevis | WLP672 | Heterofermentative | |
| L. brevis | JJ2P | Heterofermentative | Porcine |
| L. paracasei | CRL431 | Heterofermentative | Infant faeces |
| L. casei | R10 | Heterofermentative | Cheese |
| L. casei | H2 | Heterofermentative | Human |
| L. crispaticus | AB19 | Homofermentative | Sourdoug |
| L. delbreuckii | WLP677 | Homofermentative | |
| L. fermentum | AB15 | Heterofermentative | Sourdough |
| L. fermentum | AB31 | Heterofermentative | Sourdough |
| L. fermentum | F23 | Heterofermentative | Sourdough |
| L. gallinarum | AB13 | Homofermentative | Sourdough |
| L. plantarum | F6 | Heterofermentative | Sourdough |
| L. plantarum | F10 | Heterofermentative | Brewery |
| L. plantarum | F21 | Heterofermentative | Sourdough |
| L. plantarum | R11 | Heterofermentative | Cheese |
| L. plantarum | R13 | Heterofermentative | Cheese |
| L. reuteri | AB38 | Heterofermentative | Sourdough |
| L. reuteri | DSM20016 | Heterofermentative | Human intestine |
| L. reuteri | Ff2 | Heterofermentative | Porcine |
| L. reuteri | hh1P | Heterofermentative | Porcine |
| L. reuteri | R12 | Heterofermentative | Cheese |
| L. rhamnosus | C7 | Homofermentative | Cheese |
| L. rhamnosus | C8 | Homofermentative | Cheese |
| L. rhamnosus | C9 | Homofermentative | Cheese |
| L. rhamnosus | GG | Homofermentative | Human gut |
| L. sakei | AB3a | Heterofermentative | Sourdough |
| L. vaginalis | AB11 | Heterofermentative | Sourdough |
| Leuconostoc citreum | TR116 | Heterofermentative | Sourdough |

| Species | Strain | Metabolism | Origin |
|---|---|---|---|
| L. holzapfelii | AB4 | Heterofermentative | Sourdough |
| Leuconostoc lactis | E11 | Heterofermentative | Sourdough |
| Leuc. Mesenteroides | DSM20240 | Heterofermentative | Root beer |
| Weissella cibaria | MG1 | Heterofermentative | Sourdough |

Examples of acetic acid bacteria include *G. oxydans* and *K. xylinus*.

Preferably, the strains *L. planetarum* F10 and *L. rhamnosus* LGG are preferred as selected to provide desirable organoleptic properties. Possibly, a probiotic strain is added at the end of the process of production of the beverage defined in the present invention.

Hydrolysis of the BSG is performed for at least 12 hours, preferably 24 hours at a temperature in function of the enzyme(s) used (typically about 55'C), to ensure solubilization of arabinoxylans and increase in the level of WEAX to health-promoting levels of at least 1.4% (w/v). Hydrolysis is followed by a 8 to 24 hours of fermentation at about 25 to 37'C, preferably at 30° C. Preferably, the hydrolysis and fermentation steps are combined in one step (SSF) and performed during between 15 and 24 h at a temperature between 25 and 37° C., more preferably during 20 h at a temperature of 30° C. Aerobic and static conditions are used during the fermentation or SSF process.

The fermentation or SSF is followed by critical parameters such us pH, extract, total acidity (TTA) and concentration of reducing sugars. The process is considered to be finished when, for example, 4.5 g/L lactic acid are produced by the bacteria, or the total titrateble acidity (TTA) of the broth is such that 10 mL of it are titrated to pH 7 by 3 mL a 0.1M solution of sodium hydroxyde, and, more preferably, a drop of between 0.2 and 0.4 pH units from the initial pH is observed. Alcohol concentration in the fermented broth is also measured. Aerobic and static conditions are used to ensure a low alcohol concentration, below 0.20%, preferably below 0.15%, and more preferable below 0.10% in the fermented broth.

FIG. 1 shows an example of an SSF. Bacterial fermentation causes an increase in lactic acid and titratable acidity in the media. There is an initial increase in sugar concentration due to the saccharification process. After a short lag phase, bacteria begin consuming the sugar, and its concentration decreases. Fermentation is stopped when ~4.5 g/l lactic acid are produced (black arrow). In this example, the enzyme mix and initial sugar in BSG are such that no residual sugar is left at the point of stopping the fermentation.

The lactic acid fermentation or SSF process is arrested by cooling the ferment to a temperature lower than 18° C., or, preferably, heating the ferment to a temperature above 50° C.

The above described fermented broth can follow two different subsequent processes, leading to two different types of beverages or beverage components:
1. Fermented broth can be filtered to produce a filtered beverage by the following process:
    The fermented base is swirled to re-suspend settled particles.
    Solid (insoluble) particles are allowed to settle, preferably by centrifugation.
    The resulting supernatant is filtered, preferably through mash filters. Further filtration steps are possible to reduce the size of particles in the final beverage.

According to the extent of saccharification and the consequent level of residual sugar of the beverage, this beverage can have either of the following nutritional claims (see definitions):
    Low energy, fat-free, sugars-free, very low salt content; or
    low energy, fat-free, low in sugar, very low salt content; or
    fat-free, very low salt content and 'With no added sugars'.
2. Fermented broth can be homogenized to produce a beverage by the following process:
    The fermented base is swirled to re-suspend settled particles.
    The mixture is then blended, preferably by an industrial blender, until a homogenous mixture is obtained.
    According to the extent of saccharification and the consequent level of residual sugar of the beverage, this one can have either of the following nutritional claims (see definitions):
    High in fibre, fat-free, sugar-free, high in protein, very low salt content; or
    High in fibre, fat-free, low in sugar, high in protein, very low salt content; or
    High in fibre, fat free, high in protein, very low salt content and 'No added sugars'.

By filtering the fermented broth, a beverage, beverage component or food component (type 1) can be obtained that is low in energy (<20 kcal/100 mL) and/or fat free (<0.5%) and/or sugar free (<0.5%) or low in sugar (2.5% w/v) and/or very low in salt content (<0.4%) and/or contains sufficient levels of health-promoting soluble arabinoxylans (no less than 1.4% w/v, preferably 3%). A 500 mL serving of said beverage would provide 70 g of soluble arabinoxylans, or 0.1 g/kg body weight for a 70 kg adult person.

By homogenizing a beverage or beverage component (type 2) the fermented broth, a beverage, beverage component or food component (type 2) can be obtained that is low in fat content (<1.5%) and/or sugar free (<0.5%) or low in sugar (2.5% w/v) and/or high in fiber content (>1.5 g fiber/100 kcal, preferably >3 g fiber/100 kcal) and/or sufficient levels of health-promoting soluble arabinoxylans (no less than 1.4% w/v, preferably 3%) and/or high in protein (>12%, preferably >20% of the energy provided by proteins) and/or very low in salt content (<0.4%). A 500 mL serving of said beverage would provide 70 g of soluble arabinoxylans, or 0.1 g/kg body weight for a 70 kg adult person.

Since no dairy product is used in the described process, the beverage or beverage component obtained by a process according to the present invention is consequently lactose free.

The beverage can be consumed as such or can be used as a beverage component and mixed with one or more other components prior to consumption. Such components can be beverages as for example a fruit juice. The beverage can be used as a food component or food additive for foodstuffs such as: pasta products, breads and sourdoughs, cereals and cereal products, baked goods and cookies.

The final beverage, beverage component or food component obtained by the process described in this invention can be exposed to stabilization treatments, preferably pasteurization, preferably at 70 C during 30 min. Additionally, the final beverage or beverage component can be supplemented by the addition of probiotic microorganisms, preferably lactic acid bacteria.

REFERENCES

Cao, Li, Xiuzhen Liu, Tianxiu Qian, Guibo Sun, Yan Guo, Fengjin Chang, Sumei Zhou, and Xiaobo Sun. 2011.

"Antitumor and Immunomodulatory Activity of Arabinoxylans: A Major Constituent of Wheat Bran." *International Journal of Biological Macromolecules* 48 (1). Elsevier B. V.: 160-64. doi:10.1016/j.ijbiomac.2010.10.014.

Cloetens, Lieselotte, Willem F Broekaert, Yasmine Delaedt, Frans Ollevier, Christophe M Courtin, Jan A Delcour, Paul Rutgeerts, and Kristin Verbeke. 2010. "Tolerance of Arabinoxylan-Oligosaccharides and Their Prebiotic Activity in Healthy Subjects: A Randomised, Placebo-Controlled Cross-over Study." *Br J Nutr* 103 (5): 703-13. doi: 10.1017/S0007114509992248.

Efsa Panel on Dietetic Products, Nutrition and Allergies. 2011. "Scientific Opinion on the Substantiation of Health Claims Related to Arabinoxylan Produced from Wheat Endosperm and Reduction of Post-Prandial Glycaemic Responses (ID 830) pursuant to Article 13(1) of Regulation (EC) No 1924/2006." *EFSA Journal* 9 (6): 2205-n/a. doi:10.2903/j.efsa.2011.2205.

EFSA Panel on Dietetic Products Nutrition and Allergies. 2010. "Scientific Opinion on Dietary Reference Values for Carbohydrates and Dietary Fibre." *EFSA Journal* 8 (3): 1462-n/a. doi: 10.2903/j.efsa.2010.1462.

----. 2013. "Scientific Opinion on Dietary Reference Values for Energy." *EFSA Journal* 11 (1): 3005-n/a. doi:10.2903/j.efsa.2013.3005.

Ekhart, Peter Frank, Hans Van Der Saag, Sam Possemiers, Pieter Van Den Abbeele, Tom Van De Wiele, Audrey Martine Neyrinck, Nathalie Maria Nelly Delzenne, and Patrice D. Cani. 2012. Arabinoxylans for modulating the barrier function of the intestinal surface. 20120230955, issued 2012.

Garcia, A L, B Otto, S-C C Reich, M O Weickert, J Steiniger, A Machowetz, N N Rudovich, et al. 2007. "Arabinoxylan Consumption Decreases Postprandial Serum Glucose, Serum Insulin and Plasma Total Ghrelin Response in Subjects with Impaired Glucose Tolerance." *European Journal of Clinical Nutrition* 61 (3): 334-41. doi:10.1038/sj.ejcn.1602525.

Lu, Z. X., K. Z. Walker, J. G. Muir, and K. O'Dea. 2004. "Arabinoxylan Fibre Improves Metabolic Control in People with Type II Diabetes." *European Journal of Clinical Nutrition* 58 (4): 621. doi:10.1038/sj.ejcn.1601857.

Neyrinck, Audrey M., Sam Possemiers, Céline Druart, Tom van de Wiele, Fabienne de Backer, Patrice D. Cani, Yvan Larondelle, and Nathalie M. Delzenne. 2011. "Prebiotic Effects of Wheat Arabinoxylan Related to the Increase in *Bifidobacteria, Roseburia* and *Bacteroides/prevotella* in Diet-induced Obese Mice." *PLoS ONE* 6 (6). doi: 10.1371/journal.pone.0020944.

Reis, Sofia F, Nissreen Abu-Ghannam, Beatriz Gullón, Patricia Gullón, Susana Ferreira, Cláudio J Maia, Fernanda C Domingues, and José L Alonso. 2014. "Evaluation of the Prebiotic Potential of Arabinoxylans from Brewer's Spent Grain." *Applied Microbiology and Biotechnology* 98 (22): 9365-73. doi:10.1007/s00253-014-6009-8.

Sanchez, J I, M Marzorati, C Grootaert, M Baran, V Verstraete, C M Van De Wiele, W F Van Cracyveld, J A Courtin, W Broekaert, and T Delcour. 2009. "Arabinoxylan-Oligosaccharides (AXOS) Affect the Protein/carbohydrate Fermentation Balance and Microbial Population Dynamics of the Simulator of Human Intestinal Microbial Ecosystem." *Microbial Biotechnology* 2 (1): 101-13. doi: 10.1111/j.1751-7915.2008.00064.x.

Teixeira, Cristina, Margareta Nyman, Roger Andersson, and Marie Alminger. 2017. "Application of a Dynamic Gastrointestinal in Vitro Model Combined with a Rat Model to Predict the Digestive Fate of Barley Dietary Fibre and Evaluate Potential Impact on Hindgut Fermentation." *Bioactive Carbohydrates and Dietary Fibre* 9: 7-13. doi: 10.1016/j.bcdf.2016.12.001.

Zhou, Sumei, Xiuzhen Liu, Yan Guo, Qiang Wang, Dalyin Peng, and Li Cao. 2010. "Comparison of the Immunological Activities of Arabinoxylans from Wheat Bran with Alkali and Xylanase-Aided Extraction." *Carbohydrate Polymers* 81 (4): 784-89. doi:10.1016/j.carbpol.2010.03.040.

The invention claimed is:

1. A process for preparing a beverage or beverage component comprising:
   hydrolyzing brewer's spent grain by the addition of enzymes with alpha-amylase, gluco-amylase, cellulase, xylanase, protease and beta-glucanase activity, resulting in saccharified brewer's spent grain,
   fermenting the saccharified brewer's spent grain by a strain of lactic acid bacteria to obtain a fermented broth,
   wherein the steps of hydrolyzing and fermenting are combined in one step performed for between 15 and 24 hours at a temperature between 25 and 37° C. such that:
   said lactic acid bacteria produce 4.5 g/L lactic acid and metabolise sugar such that the resulting fermented broth contains less than 2.5% w/w residual sugar;
   filtering the fermented broth and collecting the permeate to obtain the filtered beverage or filtered beverage component, or
   homogenizing the fermented broth to obtain the homogenized beverage or homogenized beverage component, and
   supplementing the filtered beverage or filtered beverage component, or the homogenized beverage or homogenized beverage component, with a probiotic microorganism being a lactic acid bacteria,
   wherein the beverage or beverage component comprises at least 1.4% (w/v) of water-extractable arabinoxylans (WEAX).

2. The process according to claim 1, the residual sugar exclusively originating from the brewers' spent grain.

3. The process according to claim 1, wherein brewer's spent grain is treated with enzymes to solubilize arabinoxylans.

4. The process according to claim 1, comprising the step of mixing the beverage component with a diluent, compound or another beverage to obtain a beverage.

5. The process according to claim 1, wherein the final beverage is supplemented by a probiotic microorganism after pasteurization, the probiotic microorganism consisting of *Lactobacillus rhamnosus*.

6. A beverage or beverage component obtained by fermentation of saccharified brewer's spent grain and homogenization of fermented broth and spent grain, the beverage or beverage component comprising at least 1.4% (w/v) of water-extractable arabinoxylans (WEAX), proteins in a level sufficiently high such that at least 12% of the total caloric value of the beverage or beverage component originates from proteins therein, the beverage or beverage component supplemented with a probiotic microorganism of lactic acid bacteria.

7. The beverage or beverage component according to claim 6, being a low calorie/energy beverage having a caloric value of:
   less than 20 kcal/100 mL, or
   at least 20 kcal/100 g.

8. The beverage or beverage component according to claim 7, having a sugar content of
less than 0.5% w/v, or
at least 0.5% w/v and less than 2.5% w/v or
at least 2.5% w/v.

9. The beverage or beverage component according to claim 6, having a sugar content of
less than 0.5% w/v, or
at least 0.5% w/v and less than 2.5% w/v, or
at least 2.5% w/v.

10. The beverage or beverage component according to claim 6 comprising, 3% (w/v) of water-extractable arabinoxylans (WEAX).

11. The beverage or beverage component according to claim 6, having a fat content of less than 1.5 w %.

12. The beverage component according to claim 6 wherein the beverage or beverage component is lactose free.

13. The beverage or beverage component according to claim 6 having a fiber content of at least 1.5 g per 100 kcal of beverage or beverage component.

14. The beverage or beverage component according to claim 13, being a low calorie/energy beverage having a caloric value of:
less than 20 kcal/100 mL, or
at least 20 kcal/100 g.

15. The beverage or beverage component according to claim 13, having a sugar content of
less than 0.5% w/v, or
at least 0.5% w/v and less than 2.5% w/v, or
at least 2.5% w/v.

16. A beverage or beverage component obtained by fermentation of saccharified brewer's spent grain and filtering the fermented broth from the spent grain and supplemented with a probiotic microorganism of lactic acid bacteria, wherein the beverage or beverage component comprises at least 1.4% (w/v) of water-extractable arabinoxylans (WEAX).

17. The beverage or beverage component according to claim 16, being a low calorie/energy beverage having a caloric value of:
less than 20 kcal/100 mL, or
at least 20 kcal/100 g.

18. The beverage or beverage component according to claim 16, having a sugar content of
less than 0.5% w/v, or
at least 0.5% w/v and less than 2.5% w/v, or
at least 2.5% w/v.

* * * * *